UNITED STATES PATENT OFFICE.

MAX GRÜNZWEIG, OF MUNICH, GERMANY.

MANUFACTURE OF POROUS CERAMIC OBJECTS.

1,068,762.  Specification of Letters Patent.  Patented July 29, 1913.

No Drawing.  Application filed December 8, 1908.  Serial No. 466,549.

*To all whom it may concern:*

Be it known that I, MAX GRÜNZWEIG, chemist, and a subject of the German Emperor, and resident of Türkenstrasse 11, Munich, in the Kingdom of Bavaria, Germany, have invented new and useful Improvements in the Manufacture of Porous Ceramic Objects, of which the following is a specification.

Porous ceramic objects are produced by mixing with the mineral matter organic bodies which are burned out during the burning operation. As a rule the heating value of these combustibles is sufficient to burn completely the fireproof goods so that the external addition of heat is necessary only to attain the ignition temperature of a part of the contents of the kiln sufficient for continuance of the combustion. When the air supplied to the kiln is rightly proportioned the kiln burns itself out in time, the time being dependent on the amount of combustible and the temperature. This simple method, requiring little supervision is very satisfactory for articles which are to have little porosity and therefore contain little combustible, especially when they are burned at a high temperature; but when the articles are to be highly porous and therefore contain a large proportion of combustible and owing to their porosity are very sensitive to an excessively high temperature it becomes impracticable. Excessive temperature can only be avoided at the cost of time and space by protracting the burning operation as much as possible, which is generally effected by decreasing the draft and by ventilating the articles in the kiln as much as possible; so as to prevent accumulation of heat.

Apart from the lack of economy of such a procedure it is always of very doubtful efficiency in preventing rise of temperature as stray currents of air always find their way into the kiln owing to the latter not being air tight, and the weaker the draft the greater the damage caused by these. Unequal currents of heat and zones of combustion cause unequal burning of the articles which become spotty and, owing to unequal strains, turn out to be of less value.

The object of the present invention is to prevent such disadvantages and comprises a burning process whereby the contents of a kiln can be burned at any suitable temperature in any suitable period of time, thus making the maximum use of the available space.

The new process consists essentially in conducting the burning not exothermally, that is to say not with generation of heat accompanied by dangerous rise of temperature, but athermally, that is to say without alteration of the total amount of heat at the temperature found to be suitable which temperature is constant, no matter how much combustible is present or within what time the burning operation is to be completed.

The heat generated by the combustion of the organic bodies as well as the heat applied to the kiln externally, is caused, after the temperature of reaction has been attained, to disappear by an endothermic process, that is a chemical process which absorbs heat, such as by passing through the kiln a current of $CO_2$ or $H_2O$ vapor or of $CO_2$ and $H_2O$ vapor, with or without admixture of atmospheric oxygen, the heat being thus conducted away in a latent form. $CO_2$ and $H_2O$ vapor, even at low temperatures, secure the expulsion of a part of the organic bodies in the articles to be burned by dry distillation, while when a red heat is attaining the pure carbon left by the distillation is burned to CO ($H_2O+C$ becoming $H_2+CO$) and passes off as such in a gaseous form. Both changes are accompanied by absorption of heat and must me so balanced that by burning a part of the combustible with atmospheric oxygen and by the heat conveyed to the kiln by the air containing this oxygen, that thermal equilibrium at the desired temperatures is maintained. This temperature must be constant since the total amount of heat is always the same, and by increasing the proportion of the reaction mixture the time of burning can be considerably hastened.

The temperature and qualitative composition of the reacting mixture of gases may be allowed a very wide variation in each case and is determined by the following data:—amount of combustible, heat of distillation, heat of decomposition of $H_2O$ and $CO_2$, the latter being endothermic, heat of combustion of C to $CO_2$ and H to $H_2O$, this being exothermic, as well as the specific heats of the gases and articles to be burned.

As regards the practical application of the process, the $H_2O$ and $CO_2$ can be produced in any suitable manner and can of course be diluted with nitrogen or other indifferent gases, which are, as a matter of fact, carried forward when $CO_2$ is produced by combustion in air. In this case such nitrogen or gases are useful in that they take up heat and so help to cool the kiln. The required gases and vapor can be obtained, with suitable precautions, from the firing already to hand, but of course separate gas producers generators and the like are more suitable for obtaining a mixture of constant composition. For example in the case of a steam superheating plant, both the steam and the flue gases used for generating and heating it are led into the kiln, so that the loss of heat is as small as possible. Furthermore it is advisable to construct a kiln working in this manner as a continuous kiln, be it a ring kiln or a channel kiln, somewhat after the manner of a Mendheim ring gas kiln so that the latent heat passing from the oven in the form of $H_2$ and $CO$ can be used again after it has been liberated by combustion in air. This heat can also easily be used for drying the freshly made goods.

Now what I claim and desire to secure by Letters Patent is the following:

1. The process of making porous objects consisting in embedding combustible material in the plastic mass, burning the said material embedded in the plastic mass and maintaining the temperature of reaction substantially constant by bringing into intimate relation to the plastic mass a current of gas adapted to be disassociated by the heat of said combustion thereby producing a chemical action which will absorb sufficient heat to prevent a dangerous rise of temperature.

2. The process of making porous objects consisting in embedding combustible material in the plastic mass, burning the said material embedded in the plastic mass and absorbing the surplus heat by chemical action occurring within the zone of combustion and under such control as to render the temperature of the combustion reaction substantially constant, substantially as described.

In testimony, that I claim the foregoing as my invention, I have signed my name in presence of two witnesses, this twenty fourth day of November, 1908.

MAX GRÜNZWEIG.

Witnesses:
AUGUST HARTMANN,
ABRAHAM SCHLESINGER.